Jan. 24, 1950     L. COEL     2,495,568
CLINICAL MODEL
Filed Dec. 30, 1948     2 Sheets-Sheet 1
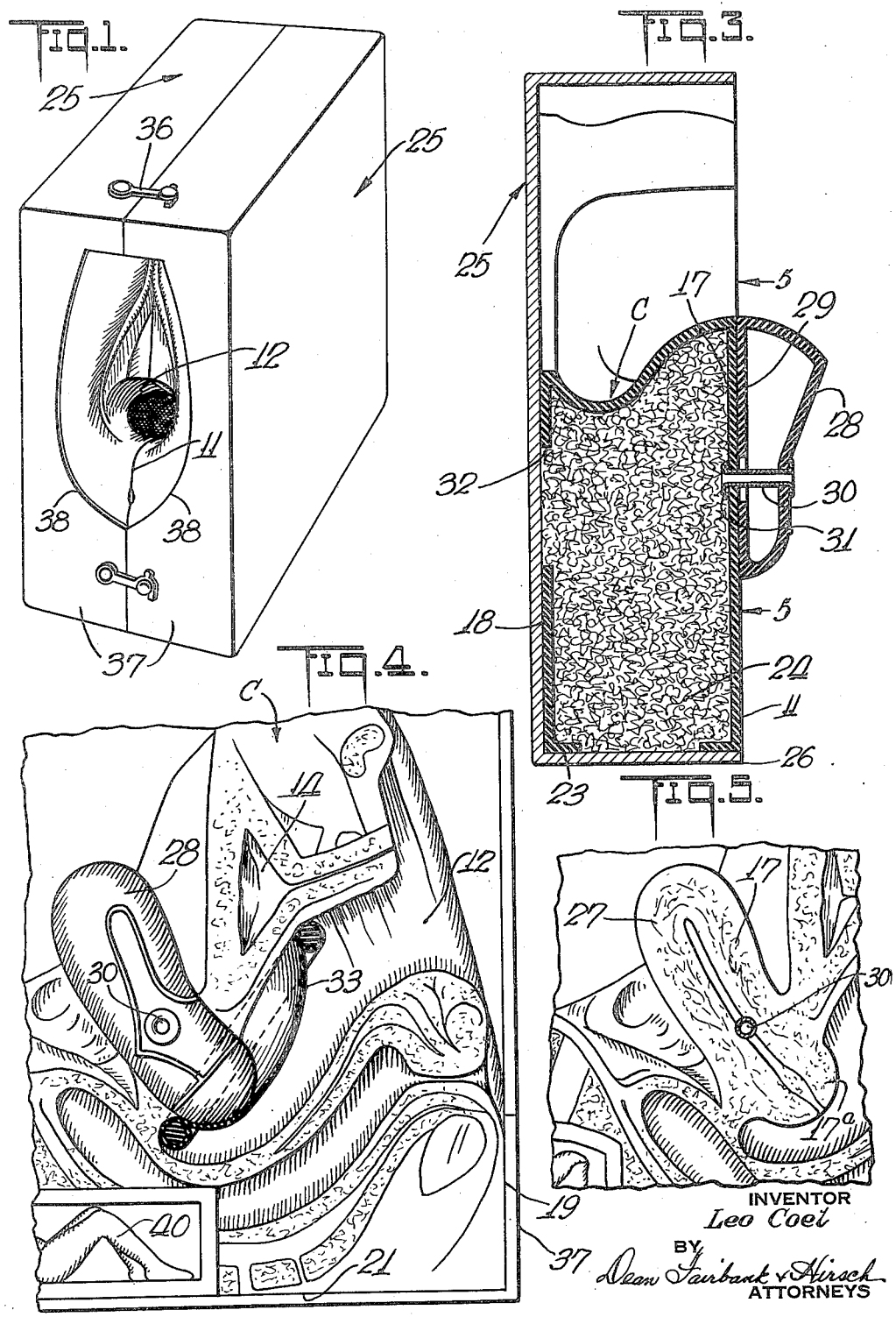
INVENTOR
Leo Coel
BY
Dean Fairbank & Hirsch
ATTORNEYS

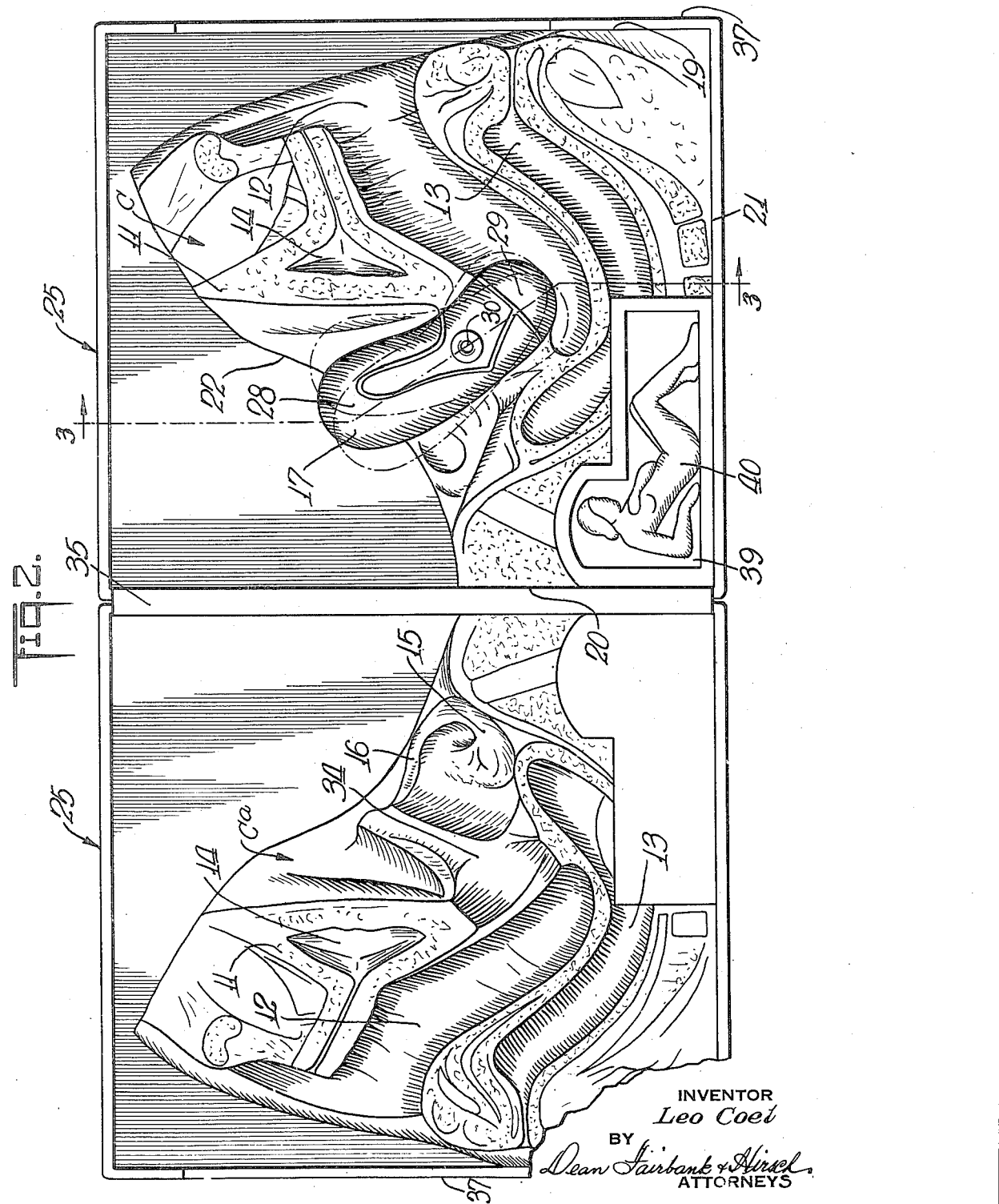

Patented Jan. 24, 1950

2,495,568

UNITED STATES PATENT OFFICE 2,495,568

CLINICAL MODEL

Leo Coel, New York, N. Y., assignor to Holland-Rantos Company, Inc., a corporation of New York Application December 30, 1948, Serial No. 68,163

4 Claims. (Cl. 35—17)

The present invention relates to clinical demonstrating models and is more especially concerned with such models of the female pelvis.

As conducive to a clear understanding of the invention, it is noted that where such models are made of sponge rubber in an effort to simulate the yielding tone of the human flesh, it is difficult to conform the same to show fine detail of the anatomy. Where on the other hand the model is cast of vulcanite or the like, its rigidity is objectionable for demonstration and instruction purposes.

It is among the objects of the invention to provide an anatomical model which lends itself readily to mass production at relatively small cost and which presents the fine detail of the sectional anatomical structure as well as substantially the firmness and elasticity or tone of the human flesh.

Another object is to provide a clinical model of the above type which lends itself readily to demonstrating both normal and various abnormal conditions of the anatomy and which facilitates study visually of anatomical detail of the sectioned anatomy as well as study by digitation of a replica of the sectioned anatomy.

In the accompanying drawings in which are shown one or more of various possible embodiments of the several features of the invention, Fig. 1 is a perspective view of the closed model, Fig. 2 is a plan view of the open model, Fig. 3 is a view in longitudinal cross section taken on line 3—3 of Fig. 2, Fig. 4 is a fragmentary sectional view showing one mode of demonstration of the model, and Fig. 5 is a sectional detail view taken on line 5—5 of Fig. 3.

Referring now to the drawings, the anatomical model comprises a casting C, preferably of vulcanized latex composition usually comprising a mixture of latex, filler, coloring matter and appropriate accelerator. The casting is hollow and is preferably made by slush-casting in a plaster mold. The casting, preferably of wall thickness of $\frac{1}{32}$ to $\frac{1}{16}$ inch is readily removed from the mold after vulcanization and presents all of the fine detail desired.

In the embodiment shown in which the invention has a very useful application, the sectioned face 11 of the anatomy presents the various depressions in substantially full scale, formed by the sectioned channels. Thus there appears as one deep groove the vaginal canal 12, as another deep groove the rectum 13, and as a third depression the corresponding section of the bladder 14. Other detail of the sectioned surface structure also is shown including the ovaries 15 the oviducts 16 and the uterus 17 with its cervix 17ª.

The casting C is preferably substantially flat at its base 18, flat at its front or anterior wall 19, its rear wall 20 and at its lower wall 21, while its upper wall 22 presents the general curvature of the corresponding portion of the anatomy.

The hollow thin walled casting of latex is preferably wide open at the lower end to present merely a thin peripheral flange 23 through which opening the excess composition is poured out in the slush casting operation. Soft, resistant, moderately resilient inexpensive filler 24 preferably cotton waste, is stuffed into the hollow latex casting completely to fill the same and to impart to it the yieldable resistance corresponding to the tone of the human flesh. By reason of the greater accumulation of rubber at the cervix 17ª that region has greater rigidity than the rest of the model to simulate the anatomy of the cervix.

In the embodiment shown, the entire uterus rather than only the longitudinal section thereof is incorporated in the model as thus far described, so that the uterus is the only element protruding above the general plane of the face 11 of the model. Preferably the uterus element is adjustable to simulate at will the abnormality of retroflexion or of ante-flexion. For this purpose the uterus element is longitudinally split along the surface of the face of the casting, half of the uterus construction being an integral part of the casting, the sectioned face 27 thereof, preferably being flat and showing the detail of the anatomy thereof. The other or protruding half of the uterus is a separate casting 28, the lower half of which presents a closed surface 29 similar to that at 27 of the complementary uterus element. The outer or displaceable separate half 28 of the uterus is pivoted to the fixed complementary half, preferably by a hollow rivet 30 which extends transversely through the superposed section facings 17 and 29 of the two uterus segments and is headed over at 31 inside the main casting. To permit such heading over in assembling the device, the rear face of the main casting is cut away as at 32 for access thereto of the rivet heading tool (not shown).

Preferably the casting according to the present invention is housed in a corresponding tray illustratively a square tray 25 the flanges of which are of height equal to the thickness of the casting so that the face 11 of said casting extends flush with the rim 26 of the tray as shown. Desirably the casting is bonded to the tray by adhesive connection at base 18, sides 19 and 20 and flange 23.

While the invention has thus far been described as applied to a single half section of pelvis, it is desirable, according to a preferred embodiment, to use castings C and Cª of the two complementary sections making up the pelvis. These two sections are substantially mirror images of each other at their exposed face, as shown, except of course that section Cᵃ has no uterus element but a depression 34 for accommodating the protruding half 28 of the uterus of section C, when the two castings are placed in superposed relation to simulate the complete pelvis structure.

While the two pelvis sections as described could be used separately or superposed as indicated, it is preferred where the two complementary sections are to be employed, to incorporate them in a unit by hinging the sections together so that they may be laid in side by side relation as shown in Fig. 2 to expose the interior, or hinged closed as in Fig. 1 to simulate the complete, as distinguished from the sectioned pelvis. To this end the pelvis sections are preferably each accommodated in a tray 25 such as that above described, the two trays being identical and hinged together by connecting strap 35 at the rim of adjacent flange walls, each tray having its rim substantially flush with the face of the casting contained therein.

When the uterus element 28 is in normal position, the case made up of the two trays can be closed and kept closed by the hooks 36 with the rim edges of the respective trays in abutting relationship. Desirably the rims of the flanges 37 opposed to the flanges of hinge 35 are provided each with a wide notch 38, the notches registering as shown to expose therethrough the outer end of the vaginal canal 12, thereby to facilitate digital exploration of the model.

The device as described lends itself readily to instruction in medical and nursing schools and also to instruction of lay patients by their physicians in the anatomy and physiology of the normal as well as of the displaced uterus. The anatomy is best taught in the open position of the model as shown in Fig. 2 in which the normal and various abnormal portions of the uterus may be demonstrated. As illustrated for instance in Fig. 4, the device affords a convenient instruction model for the application and removal of a diaphragm 33. In closed position of the model as shown in Fig. 1, digital examination of the anatomy may be taught. As shown in Fig. 1, the model is compact, light and portable in its case.

Preferably casting C has impressed therein a panel 39 upon which is molded the figure 40 of a reclining woman to indicate the posture from which the closed model is viewed from the anterior end shown in Fig. 1.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A clinical demonstrating model of the female pelvis, comprising a half section of the pelvis including the section of the vaginal canal and the uterus with its cervical end protruding into said canal, said uterus replica including two relatively displaceable longitudinal halves, one of said halves being integrally molded with the model and the other half being pivotally mounted thereon through an axis beyond the cervix to permit a variety of adjustments thereof for demonstrating various degrees of ante-flexion and retro-flexion of the uterus.

2. A clinical demonstrating model, comprising a casting of the half of the female pelvis including a face having depressions therein representing the section of various hollow elements including the vaginal canal, the rectum and the bladder, said section also showing the exposed face of the corresponding half of the uterus structure, and a separate flexible casting representing the other half of the uterus structure and affixed to the latter for adjustment to various degrees of ante-flexion and retro-flexion.

3. A clinical demonstrating model of the female pelvis, comprising a hollow flexible casting of latex composition conformed to a segment of the female pelvis and presenting at its face the sectioned surface showing as depressions the bisected canals including the vaginal canal, the colon and the bladder, said casting also presenting the flat face structure of the bisected uterus, said hollow casting being stuffed with cotton waste to reproduce the tone of the human flesh, a separate casting of flexible composition representing the complementary half of the uterus and a rivet extending through said two halves of the uterus and serving as a pivot for adjusting the position of the separate uterus segment at will to various degrees of retro-flexion and ante-flexion.

4. A clinical demonstrating model of the female pelvis, comprising a case having two identical trays hinged together and closing in rim to rim relation, the flange opposed to the hinge having registering notches in the rim thereof to afford an opening in the closed case, bodies of soft rubber duplicating the structure of the respective halves of the pelvis fixed in the respective trays and extending flush with the rim edges thereof, each of said rubber bodies presenting the corresponding half of the vaginal canal at its face with its entry end near the corresponding notch of the case, one of said rubber bodies presenting a replica of the entire uterus to fit in a corresponding depression in the complementary rubber body when the case is closed, said rubber bodies presenting the tone of the human flesh, the uterus element being longitudinally split into two sections, each section being closed along the sectional face thereof, one of said uterus sections being a unitary part of one of the rubber bodies and the other section being a separate part, and a hollow rivet affixing said separate uterus section to the fixed uterus section to permit adjustment of said separate section to ante-flexion and retro-flexion positions.

LEO COEL.

REFERENCES CITED

The following references are of record in the file of this patent:

UNITED STATES PATENTS

| Number | Name | Date |
|---|---|---|
| 411,816 | Lee | Oct. 1, 1889 |
| 1,536,125 | Moorman | May 5, 1925 |
| 2,034,446 | Saxe | Mar. 17, 1936 |
| 2,089,376 | Jacobson | Aug. 10, 1937 |
| 2,124,767 | Daun | July 26, 1938 |
| 2,132,226 | Wahlenberg | Oct. 4, 1938 |
| 2,288,296 | Munro | June 30, 1942 |
| 2,324,702 | Hoffman et al. | July 20, 1943 |

FOREIGN PATENTS

| Number | Country | Date |
|---|---|---|
| 699,055 | Germany | Nov. 21, 1940 |